Patented May 11, 1948

2,441,408

UNITED STATES PATENT OFFICE 2,441,408

ISOMERIZATION OF ALPHA PHENYLETHYL PHENOLS

Kenneth B. Goldblum, Pittsfield, Mass., assignor to General Electric Company, a corporation of New York No Drawing. Application March 21, 1945, Serial No. 584,037

7 Claims. (Cl. 260—619)

This invention relates to new and useful improvements in the art of treating substituted phenols. More particularly the invention is concerned with the improved process which comprises contacting, with sulfuric acid, a mono-(alpha-phenylethyl) phenol selected from the class consisting of ortho-(alpha-phenylethyl) phenol and para-(alpha-phenylethyl) phenol thereby to effect conversion of at least some of the mono-(alpha-phenylethyl) phenol of the defined class that is being treated to the other member of the said class.

Alpha-phenylethyl phenols are obtained, for example, by condensing phenol with styrene while admixed with a condensation catalyst, e. g., a mineral acid such, for instance, as sulfuric acid, nitric acid, hydrochloric acid, phosphoric acid, etc., and isolating the alpha-phenylethyl phenols from the reaction mass, e. g., by distillation. The products of the reaction include, for example, mono-(alpha-phenylethyl) phenols, e. g., ortho-(alpha-phenylethyl) phenol and para-(alpha-phenylethyl) phenol, as well as di-(alpha-phenylethyl) phenols, tri-(alpha-phenylethyl) phenols and tarry matter of a complex nature.

In some cases it is desirable to obtain higher yields of a particular mono-(alpha-phenylethyl) phenol than otherwise results from the condensation of phenol and styrene. For instance, at present, phenol substituted in the para position with an alpha-phenylethyl grouping has greater commercial utility, e. g., in the field of oil-soluble resin manufacture, and therefore is a more desirable and valuable product than ortho-(alpha-phenylethyl) phenol.

It is a primary object of my invention to provide an effective and economical method of treating ortho- or para-(alpha-phenylethyl) phenol whereby the one may be converted into the other. The starting substituted phenol may be one that has been isolated from the above-described phenol-styrene reaction mass or one that has been otherwise produced.

Briefly described, my method comprises contacting, preferably under heat, an ortho- or para-(alpha-phenylethyl) phenol with sulfuric acid (concentrated sulfuric acid) thereby to convert the ortho- or para-substituted phenol undergoing treatment to the corresponding para or ortho isomer. Although such catalysts as Friedel-Crafts-type catalysts, e. g., aluminum chloride, boron trifluoride, etc., cause some conversion of the starting ortho- or para-(alpha-phenylethyl) phenol to the corresponding para or ortho isomer, such catalysts are not satisfactory in my process since their use results in a decreased yield of the converted product due to undesirable side reactions and excessive "cracking" during the distillation process. Mineral acids, as a class, although suitable for condensing phenol and styrene to yield ortho- and para-(alpha-phenylethyl) phenols, as well as other phenylethyl phenols, were found to be unsuitable in converting ortho-(alpha-phenylethyl) phenol or para-(alpha-phenylethyl) phenol to the corresponding para or ortho isomer. Sulfuric acid alone was found to have the unique property of effecting the desired conversion. Such acids as, for example, hydrochloric, nitric, phosphoric and trichloroacetic were ineffective.

The addition of phenol to the reaction mixture of ortho- or para-(alpha-phenylethyl) phenol and sulfuric acid increases the yield of mono-(alpha-phenylethyl) phenols and, by reason of the equilibrium relationship hereinafter discussed, directly increases the yield of converted substituted phenol. The amount of added phenol, which apparently functions as a diluent, may be varied widely depending, for example, upon the amount of sulfuric acid used and the time and temperature of reaction. Thus I may employ, for instance, phenol in an amount corresponding to from 0.5 to 6 or more mols phenol for each mol of starting ortho- or para-(alpha-phenylethyl) phenol. The added phenol is not essential in carrying my invention into effect. However, its use is advantageous in that it retards the formation of undesirable products of the reaction such, for example, as polyphenyl phenols, poly-(alpha-phenylethyl) phenols, tars, etc.

Under optimum conditions of temperature, reaction time and catalyst concentration, the reaction mass contains ortho-(alpha-phenylethyl) phenol and para-(alpha-phenylethyl) phenol in the ratio of, by weight, approximately 2 parts of the former to 3 parts of the latter, together with small amounts of poly-(alpha-phenylethyl) phenols, tarry matter, etc. The ortho- and para-(alpha-phenylethyl) phenols and other phenols are separated from the reaction mass, for example by distillation through a packed column. If the ortho- and para-(alpha-phenylethyl) phenols are first separated from the reaction mass as a single fraction containing a mixture of these two isomers, this fraction may be redistilled, if desired, to separate the one isomer from the other. By repeating the conversion treatment of the separated ortho- or para-(alpha-phenylethyl) phenol, excellent yields of the converted substituted phenol based on the original amount of unconverted substituted phenol are obtained.

At the end of the reaction period it is advantageous to treat the reaction mass to remove the sulfuric acid. This may be done, for instance, by washing the mass with water containing a neutralizing agent, e. g., a hydroxide, carbonate or bicarbonate of magnesium or of the alkali or alkaline-earth metals, more specific examples of which are sodium carbonate, sodium hydroxide, sodium bicarbonate, calcium hydroxide, etc. Unless the sulfuric acid be neutralized, charring of the organic components of the mass may occur when distilling the mass to separate the distillable components including diluent phenol, if any, and converted and unconverted substituted phenols. Solid impurities or contaminants, for example the salt formed when the acid is neutralized, unreacted alkaline material, etc., preferably are removed, for instance by filtration, prior to the distillation step.

My process for converting ortho- or para-(alpha-phenylethyl) phenol to the corresponding para or ortho isomer may be carried out under a variety of temperature and pressure conditions, for example at normal (20° to 30° C.) or elevated temperature and at atmospheric, subatmospheric or superatmospheric pressure. Preferably the conversion is effected at a temperature within the range of 120° to 200° C. at atmospheric or substantially atmospheric pressure. Higher temperatures favor the formation of less desirable products, such as tars, etc.

The amount of sulfuric acid (concentrated sulfuric acid) may be varied over a wide range depending, for instance, upon the rapidity with which it is desired to effect the conversion. Generally, the amount of sulfuric acid will not exceed substantially 5 per cent by weight of the organic starting ingredient or ingredients. More particularly, the amount of concentrated sulfuric acid, e. g., acid containing about 90 to 96 per cent $H_2SO_4$, will not exceed substantially 5 per cent by weight of the starting ortho- or para-(alpha-phenylethyl) phenol or mixture of phenol and ortho- or para-(alpha-phenylethyl) phenol, and may be considerably less, for example as little as about 0.2 per cent by weight thereof. Good results have been obtained in effecting the desired conversion using from about 0.5 to about 2.5 per cent by weight (of the other ingredient or ingredients) of concentrated sulfuric acid as a conversion catalyst. When the sulfuric acid is employed in an amount much above about 5 per cent by weight of the organic starting ingredient or ingredients, an objectionable amount of tarry material tends to be produced with a consequent decrease in the yield of converted isomer.

The time required for effecting the desired conversion likewise varies widely depending, for instance, upon the temperature at which the reaction is effected and the amount of sulfuric acid used. From a practical standpint it is desirable to continue the reaction until the reaction mass contains ortho-(alpha-phenylethyl) phenol and para-(alpha-phenylethyl) phenol in substantially an equilibrium ratio, more particularly the equilibrium ratio previously described. Ordinarily a satisfactory conversion will be effected in from about ¼ to 10 or 12 hours. Under optimum conditions with regard to temperature and amount of sulfuric acid employed, I have found that a period of the order of 2 to 6 hours is most suitable. Increasing the time of reaction increases the yield of converted phenol, other conditions being the same, up to the point at which the conversion reaches an equilibrium. Any further increase in the period of reaction generally results in an increase in the amount of tarry matter and thus reduces the amount of converted substituted phenol in the reaction mass, although the ratio of ortho-(alpha-phenylethyl) phenol to para-(alpha-phenylethyl) phenol in the said mass remains substantially the same.

In order that those skilled in the art better may understand how my invention may be practiced, the following examples are given by way of illustration and not by way of limitation. The sulfuric acid was concentrated sulfuric acid (approximately 96% $H_2SO_4$, about 1.84 specific gravity). The ortho-(alpha-phenylethyl) phenol employed in certain of the examples boiled within the range of 300°–302° C. at 742 mm. pressure. All parts and percentages are by weight.

*Example 1*

|  | Parts | Approx. Mol Ratio |
|---|---|---|
| Synthetic phenol | 282.3 | 3 |
| Ortho-(alpha-phenylethyl) phenol | 198.0 | 1 |
| Concentrated sulfuric acid | 3.6 | |

The above ingredients were mixed together in a three-necked, round-bottomed flask equipped with a reflux condenser, a mercury-sealed mechanical stirrer and a thermometer. The mixture was heated, with stirring, at a temperature of about 167° to 169° C. for approximately 8 hours. After cooling the reaction mass, it was neutralized with an excess of a concentrated aqueous solution of sodium carbonate. The mixture of sodium sulfate and unreacted sodium carbonate which precipitated was removed by filtration. The filtrate was distilled, using a flask provided with a packed column 1 inch in diameter and 8 inches long. The fraction boiling within the range of 210°–230° C. at about 50 mm. pressure contained the ortho- and para-(alpha-phenylethyl) phenols and amounted to 148.5 parts. This fraction showed upon analysis that about 56.3% thereof was para-(alpha-phenylethyl) phenol (boiling point 315°–316° C. at 742.2 mm.) and about 43.7% was ortho-(alpha-phenylethyl) phenol boiling at 300°–302° C. at 742 mm. The isomers are separated from each other by fractional distillation.

*Example 2*

In this example the same procedure and ingredients were used as in Example 1 with the exception that 6.4 instead of 3.6 parts sulfuric acid were employed. Also, the time of reaction was limited to 2 hours at 176°–177° C. instead of 8 hours at 167°–169° C. Upon fractionally distilling the mass, 164 parts of a fraction containing ortho- and para-(alpha-phenylethyl) phenols were obtained. Analysis of the fraction showed 58.7% para-substituted phenol and 41.3% ortho-substituted phenol. As in Example 1, so likewise in this example and in the examples that follow the isomers are separated from each other by fractional distillation.

*Example 3*

The same procedure and ingredients were used as in Example 2 with the exception that the temperature of reaction was 163°–165° C. instead of 176°–177° C. Fractional distillation yielded 163 parts of a mixture containing ortho- and para- (alpha-phenylethyl) phenols of which 58.1% was the para isomer and 41.9% the ortho isomer.

*Example 4*

This example is the same as Example 3 with the exception that the period of reaction was 8 hours instead of 2 hours. Upon fractional distillation of the reaction mass there was obtained 161.5 parts of a mixture which, upon analysis, showed that 58.5% was para-(alpha-phenylethyl) phenol and 41.5% was ortho-(alpha-phenylethyl) phenol.

*Example 5*

In this example the same procedure and ingredients were used as in Example 1 with the exception that 12 instead of 3.6 parts sulfuric acid were employed. In addition, the reaction time was 2 hours instead of 8 hours and the reaction temperature was 170°–174° C. instead of 167°–169° C. Upon fractional distillation, a fraction was obtained that contained 156 parts of ortho- and para-(alpha-phenylethyl) phenols of which 57.5% was shown by analysis to be the para isomer and 42.5% the ortho isomer.

When the reaction was effected at approximately the same temperature for 4 hours instead of 2 hours, the yield and ratio of ortho- and para-(alpha-phenylethyl) phenols were almost the same.

*Example 6*

The same ingredients and procedure were used as in Example 1 with the exception that 6.4 instead of 3.6 parts sulfuric acid were employed as catalyst and the reaction was conducted at approximately 145° C. instead of 167°–169° C. On fractional distillation 162 parts of a fraction containing 58.5% para-(alpha-phenylethyl) phenol and 41.5% ortho-(alpha-phenylethyl) phenol were obtained.

Similar yields were obtained when the amount of mineral acid conversion catalyst, specifically sulfuric acid, was increased to 12 parts and the reaction time was decreased from 8 to 4 hours.

*Example 7*

|  | Parts | Approx. Mol Ratio |
| --- | --- | --- |
| Synthetic phenol | 94.1 | 1 |
| Ortho-(alpha-phenylethyl) phenol | 198.0 | 1 |
| Concentrated sulfuric acid | 4.8 |  |

The above ingredients were heated together for 4 hours at 187°–192° C. in a manner similar to that described under Example 1. After neutralization, filtration of the neutralized mass to remove solid impurities and fractional distillation of the filtrate, I obtained about 146 parts of a fraction containing a mixture of ortho- and para-(alpha-phenylethyl) phenols of which about 60% was the para isomer and 40% the ortho isomer.

An almost identical yield of para- and ortho-(alpha-phenylethyl) phenols was obtained when the mol ratio of phenol to ortho-(alpha-phenylethyl) phenol was raised from equimolecular proportions to 1.5 mols phenol per mol of the ortho isomer and the reaction temperature was lowered to 169°–170° C. while otherwise maintaining the same conditions. Further increases in the ratio of phenol to ortho-(alpha-phenylethyl) phenol resulted in a slight increase in the yield of the mixture of ortho and para isomers.

*Example 8*

This example illustrates the conversion of para-(alpha-phenylethyl) phenol to ortho-(alpha-phenylethyl) phenol. The para-(alpha-phenylethyl) phenol employed boiled at 315°–316° C. at about 742 mm. pressure.

|  | Parts | Approx. Mol Ratio |
| --- | --- | --- |
| Synthetic phenol | 282.3 | 3 |
| Para-(alpha-phenylethyl) phenol | 198.0 | 1 |
| Concentrated sulfuric acid | 6.4 |  |

The above ingredients were heated together for 4 hours at about 163°–165° C. in a manner similar to that described under Example 1. After neutralization with a concentrated aqueous solution of sodium carbonate and removal of the solid impurities (e. g., salts resulting from the neutralization of the acid, etc.) by filtration, 158 parts of a fraction containing ortho- and para-(alphaphenylethyl) phenols were obtained upon fractional distillation of the filtrate. Analysis of this fraction showed that it consisted of about 62% para-(alpha-phenylethyl) phenol and 38% ortho-(alpha-phenylethyl) phenol. The isomers are separated from the fraction by distillation.

*Example 9*

This example illustrates the conversion of ortho-(alpha-phenylethyl) phenol to para-(alpha-phenylethyl) phenol in the absence of phenol as a diluent.

|  | Parts |
| --- | --- |
| Ortho-(alpha-phenylethyl) phenol | 198.0 |
| Concentrated sulfuric acid | 1.98 | were heated together for 8 hours at 170°–176° C. in a manner similar to that described under Example 1. After neutralization with a concentrated aqueous solution of sodium carbonate, the solid impurities were removed by filtration. Upon fractional distillation of the filtrate, 96.6 parts of a fraction containing ortho- and para-(alphaphenylethyl) phenols were obtained. Analysis of this fraction showed that it consisted of about 62.5% para-(alpha-phenylethyl) phenol and about 37.5% ortho-(alpha-phenylethyl) phenol. A comparison of the yield (96.6 parts) of ortho- and para-(alpha-phenylethyl) phenols obtained in this example with the yields obtained in Examples 1 to 8, inclusive, shows clearly the increased yields of total alpha-phenylethyl phenols that result when phenol is a component of the initial reaction mixture. Thus, in the prior examples where diluent phenol was present in the reaction mass, the combined yield of ortho- and para-(alpha-phenylethyl) phenols ranged from about 74% to 83% of the amount of starting alpha-phenylethyl phenol whereas in this example the combined yield of ortho- and para-(alpha-phenylethyl) phenols was only about 48.8% of the amount of starting ortho-(alphaphenylethyl) phenol.

What I claim as new and desire to secure by Letters Patent of the United States is:

1. The process of producing para-(alphaphenylethyl) phenol which comprises heating a mixture containing phenol, ortho-(alpha-phenylethyl) phenol and concentrated sulfuric acid in an amount corresponding to, by weight, from about 0.2 to about 5 per cent of the total amount of phenol and ortho-(alpha-phenylethyl) phenol, said heating being continued until the reaction mass contains ortho-(alpha-phenylethyl) phenol and para-(alpha-phenylethyl) phenol in substantially an equilibrium ratio, neutralizing the acid reaction mass, and distilling the neutralized mass to separate para-(alpha-phenylethyl) phenol.

2. The method of preparing para-(alpha-phenylethyl) phenol which comprises heating a mixture containing phenol, ortho-(alpha-phenylethyl) phenol and concentrated sulfuric acid in an amount corresponding to, by weight, from about 0.2 to about 5 per cent of the total amount of phenol and ortho-(alpha-phenylethyl) phenol, said heating being continued at a temperature within the range of 120° to 200° C. until the reaction mass contains ortho-(alpha-phenylethyl) phenol and para-(alpha-phenylethyl) phenol in substantially an equilibrium ratio, neutralizing the acid reaction mass, filtering the neutralized mass to remove solid impurities, and distilling the filtrate to separate para-(alpha-phenylethyl) phenol.

3. The method of preparing para-(alpha-phenylethyl) phenol which comprises heating a mixture containing phenol and ortho-(alpha-phenylethyl) phenol in an amount corresponding to from 0.5 to 6 mols of phenol per mol of ortho-(alpha-phenylethyl) phenol and, in addition to said phenols, concentrated sulfuric acid in an amount corresponding to, by weight, from about 0.2 to about 5 per cent of the total amount of phenol and ortho-(alpha-phenylethyl) phenol, said heating being continued for a period ranging from about ¼ to 12 hours thereby to obtain a reaction mass in which ortho- and para-(alpha-phenylethyl) phenols are present in substantially an equilibrium ratio, neutralizing the acid reaction mass, filtering the neutralized mass to remove solid impurities, and separating para-(alpha-phenylethyl) phenol from the filtrate by distillation.

4. The process which comprises heating a mixture containing phenol, a mono-(alpha-phenylethyl) phenol selected from the class consisting of ortho-(alpha-phenylethyl) phenol and para-(alpha-phenylethyl) phenol, and concentrated sulfuric acid in an amount corresponding to, by weight, from about 0.2 to about 5 per cent of the total amount of phenol and mono-(alpha-phenylethyl) phenol, said heating being continued until the reaction mass contains ortho-(alpha-phenylethyl) phenol and para-(alpha-phenylethyl) phenol in substantially an equilibrium ratio, neutralizing the acid reaction mass, and distilling the neutralized mass to separate the ortho- and para-(alpha-phenylethyl) phenols.

5. The process of producing ortho-(alpha-phenylethyl) phenol which comprises heating a mixture containing phenol, para-(alpha-phenylethyl) phenol and concentrated sulfuric acid in an amount corresponding to, by weight, from about 0.2 to about 5 per cent of the total amount of phenol and para-(alpha-phenylethyl) phenol, said heating being continued until the reaction mass contains ortho-(alpha-phenylethyl) phenol and para-(alpha-phenylethyl) phenol in substantially an equilibrium ratio, neutralizing the acid reaction mass, and distilling the neutralized mass to separate ortho-(alpha-phenylethyl) phenol.

6. The method of preparing ortho-(alpha-phenylethyl) phenol which comprises heating a mixture containing phenol, para-(alpha-phenylethyl) phenol and concentrated sulfuric acid in an amount corresponding to, by weight, from about 0.2 to about 5 per cent of the total amount of phenol and para-(alpha-phenylethyl) phenol, said heating being continued at a temperature within the range of 120° to 200° C. until the reaction mass contains ortho-(alpha-phenylethyl) phenol and para-(alpha-phenylethyl) phenol in substantially an equilibrium ratio, neutralizing the acid reaction mass, filtering the neutralized mass to remove solid impurities, and distilling the filtrate to separate ortho-(alpha-phenylethyl) phenol.

7. The method of preparing ortho-(alpha-phenylethyl) phenol which comprises heating a mixture containing phenol and para-(alpha-phenylethyl) phenol in an amount corresponding to from 0.5 to 6 mols of phenol per mol of para-(alpha-phenylethyl) phenol and, in addition to said phenols, concentrated sulfuric acid in an amount corresponding to, by weight, from about 0.2 to about 5 per cent of the total amount of phenol and para-(alpha-phenylethyl) phenol, said heating being continued for a period ranging from about ¼ to 12 hours thereby to obtain a reaction mass in which ortho- and para-(alpha-phenylethyl) phenols are present in substantially an equilibrium ratio, neutralizing the acid reaction mass, filtering the neutralized mass to remove solid impurities, and separating ortho-(alpha-phenylethyl) phenol from the filtrate by distillation.

KENNETH B. GOLDBLUM.

REFERENCES CITED

The following references are of record in the file of this patent:

UNITED STATES PATENTS

| Number | Name | Date |
|---|---|---|
| 2,189,805 | Kyrides | Feb. 13, 1940 |
| 2,315,556 | Soday | Apr. 6, 1943 |
| 2,329,671 | Ward | Sept. 14, 1943 |